United States Patent [19]

Loerch

[11] Patent Number: 4,632,612
[45] Date of Patent: Dec. 30, 1986

[54] SPINDLE ORIENTATION APPARATUS

[75] Inventor: Richard J. Loerch, Milwaukee, Wis.

[73] Assignee: Kearney & Trecker Corporation, West Allis, Wis.

[21] Appl. No.: 769,424

[22] Filed: Aug. 26, 1985

[51] Int. Cl.[4] .......................... B23Q 5/20; B23B 47/04
[52] U.S. Cl. .......................................... 409/231; 408/9
[58] Field of Search .................... 409/231, 208; 408/9, 408/6, 11, 238; 318/569; 29/568; 74/341, 342, 344

[56] References Cited

U.S. PATENT DOCUMENTS

| 3,422,724 | 1/1969 | Zankl et al. | 405/231 |
| 3,520,228 | 7/1970 | Wohlfeil | 409/231 X |
| 3,893,371 | 7/1975 | Frazier | 409/231 X |
| 4,220,430 | 9/1980 | Meiser | 409/231 |
| 4,449,866 | 5/1984 | Lohneiseld | 408/9 |

FOREIGN PATENT DOCUMENTS

| 221857 | 5/1985 | German Democratic Rep. | 409/231 |
| 8201841 | 6/1982 | Japan | 409/231 |

Primary Examiner—William R. Briggs
Attorney, Agent, or Firm—James O. Skarsten

[57] ABSTRACT

An apparatus for angularly orienting a machine tool spindle (24) to a keylock position includes a resolver (39) which is directly mounted on a shaft (13) of a spindle drive motor (12), the spindle (24) rotating synchronously with the shaft (13) through a shiftable gear train. Resolver (39) is connected to update a register (45) so that the count shown by the register indicates the angular position of shaft (13) with respect to the spindle head (11) as the shaft rotates. During synchronous rotation, a target (33) revolving with the spindle causes a proximity sensor (32) on the spindle head (11) to generate a pulse when the spindle (24) is in a known orientation relative to the spindle head (11). When a pulse occurs a data processing unit (46) of a numerical control circuit (42) compares the actual count in register (45) with a number of possible count values contained in a data storage table (44). Each of the stored register count corresponds to one of a number of angular orientations of spindle (24) with respect to shaft (13) which are possible when the spindle (24) and shaft (13) are engaged through the gear train. By noting the stored register count which is closest to the actual count, the orientation of the spindle (24) with respect to the shaft (13) is readily determined. Such data is then employed by numerical control (42) to orient the spindle in the keylock position.

7 Claims, 5 Drawing Figures

4,632,612

SPINDLE ORIENTATION APPARATUS

BACKGROUND OF THE INVENTION

In machine tools equipped with automatic tool change mechanisms it is usually necessary to stop the rotation of the spindle at a particular angular orientation, referred to as the keylock position. This is done to obtain meshing engagement of a key on the cutting tool with a keyway on the spindle when the tool is transferred into the spindle by the tool change mechanism. Such angular orientation of the spindle is achieved by means of a transducer such as a resolver or the like.

The output shaft of a motor for driving the spindle is coupled to the spindle through a gear train because of the wide range of speeds required for the spindle rotation. Even though the motor is controlled to be driven at different speeds, in order to obtain a wider range of speeds, the gear train is provided with a shiftable gear cluster that shifts into either a low range of speeds or a high range of speeds. As a result, during the shifting of the gears, the drive train from the motor to the spindle is momentarily interrupted.

It has been the practice in the past to drive the transducer directly from the spindle so that the transducer and spindle rotate in unison. With this arrangement the required synchronization between the spindle and the transducer to obtain accurate angular orientation of the spindle upon termination of its rotation presents no problem.

However, the difficulty with such an arrangement is that in order to obtain the desired angular orientation of the spindle, the motor shaft must be accurately stopped to obtain the positioning of the spindle. The motor is coupled to the spindle, and therefore to the transducer, through the gear train and an appreciable amount of backlash exists in the gear train. As a result, inaccuracies may be introduced between the motor and the transducer and hunting of the motor may occur.

It has been generally recognized that for precise control of the motor the ideal arrangement is for the transducer to be driven directly from the motor shaft. In one arrangement, the motor shaft drives a resolver which increments a register such that the count in the register at any given time precisely indicates the angular orientation of the motor shaft at the given time. Since the spindle rotates synchronously with the shaft through the gear train, the count also indicates the angular orientation of the spindle at any time, if it is known that a particular count represents a particular spindle orientation. However, during shifting of gears in the gear train coupling the motor to the spindle, the spindle may not rotate synchronously with the shaft and resolver, allowing the angular position of the spindle relative to the shaft and resolver to change by an unknown amount. Thus, the relationship between spindle orientation and the count contained in the register is no longer known.

This problem was dealt with in U.S. Pat. No. 4,449,866 which issued on May 22, 1984 to Lohneis et al. Such patent teaches an arrangement wherein a shiftable gear cannot move out of mesh with an engaged gear until it engages the teeth of a new gear. Thus, none of the gears are ever free to rotate without being in mesh with a complementary gear. With this system, the transducer can be driven directly off of the motor shaft and yet will not lose synchronism with the spindle even though the motor drives the spindle through a gear train with shiftable gears. However, a shifting action cannot take place unless all the gears are completely at rest.

The present invention is an arrangement wherein a motor shaft directly drives a resolver or other transducer device to generate an output representing the angular position of the shaft, and at the same time drives a spindle through a gear train. After the gears have been shifted, it is necessary to determine the angular position or orientation of the spindle with respect to the motor shaft so that the motor can be operated to stop the spindle in its keylock position. This could be done by means of structure which causes a signal to be generated when a reference point on the spindle passes a fixed reference point located proximate to the spindle. Spindle position is thus known when the signal occurs, and the transducer output at such time indicates the angular orientation of the shaft. Such information may be used to readily determine spindle position with respect to the motor shaft. Unfortunately, however, structure which is practical for use in such an arrangement may introduce the following errors: (1) Signals may be generated when the point on the spindle is anywhere within a small range of positions with respect to the fixed point, rather than at one specific point; and (2) the transducer device may not register counts quickly enough to represent the actual position of the motor shaft when a signal is generated.

In the invention, it has been recognized that the spindle can have only certain discrete angular positions with respect to the shaft when the spindle and motor shaft are engaged through the gear train. The number and specific values of these positions is determined by the gear ratio of the gear train, which includes a driving gear fixed for rotation with the motor shaft and a gear fixed to the spindle. The discrete spindle positions, in turn, correlate with discrete or specific values of transducer output. By comparing output values indicated by the transducer when one or more signals occur with the limited number of possible correlating transducer values, the angular position of the spindle with respect to the shaft can be accurately determined.

BRIEF SUMMARY OF THE INVENTION

Briefly, in accordance with the invention, there is provided an improved system for determining the angular position of a machine tool spindle which is rotatably journaled in a spindle head for rotation in a low range of speeds as well as in a high range. An electric motor is connected to drive the spindle through a gear train. A shiftable cluster gear in the gear train is arranged for rotation about an axis parallel to both the axes of the spindle rotation and the motor drive shaft. The cluster gear includes a pair of gears that shift into engagement with either a high speed gear or a low speed gear respectively, both of which are keyed to the spindle. A proximity sensor is positioned to generate a signal each time a reference point rotating with the spindle passes a fixed point during selected spindle revolutions. A transducer is coupled to the output shaft of the motor to provide a continually updated output indicating the angular orientation of the shaft. The machine tool is provided with a numerical control circuit operatively connected to receive transducer outputs occuring when signals are generated by the sensor. After the cluster gear has shifted, so that the angular position of the spindle has become unknown, the numerical control circuit compares the received transducer outputs with discrete possible output values stored in the circuit, which are determined by the gear ratio between the spindle gear and a gear keyed to the motor shaft. The circuit thus determines the angular position of the spindle to a specified high degree of accuracy.

In a preferred manner, the proximity sensor is positioned at a known fixed point adjacent the low speed gear on the spindle shaft and a sensor target is positioned at a known location on the gear. The target thus revolves in an orbit with the rotation of the gear and actuates the proximity sensor every time it passes it to produce a pulse. The transducer usefully includes a resolver connected directly to the output shaft of the motor and a register device driven or incremented by the resolver. The count in the register each time one or more pulses occurs is compared with the respective register count values which are possible, for a particular ratio of the spindle gear and drive shaft gear. The actual orientation of the spindle with respect to the shaft is thereby determined, and such information may be employed by the numerical control circuit to operate the motor to position a keyway in the spindle at a desired angular orientation when spindle rotation is terminated.

An advantage of the present invention lies in providing an improved servo-controlled spindle drive system in which angular orientation of the spindle can be re-established in a fast and efficient manner after synchronization has been lost between the transducer and the spindle because of the shifting of connecting gears.

Another advantage lies in providing an apparatus and method for angular orientation of a spindle or other rotary member which compensates for imprecision in position measuring or monitoring devices.

Another advantage lies in providing an improved apparatus and method for machine tool spindle orientation which can be accomplished in an economical manner utilizing standard components.

BRIEF DESCRIPTION OF THE DRAWINGS

The features of this invention believed to be novel are set forth with particularity in the appended claims. The invention itself, however, both as to organization and method of operation, together with further advantages thereof, may best be understood by reference to the following description taken in conjunction with the accompanying drawings in which:

DETAILED DESCRIPTION OF THE PREFERRED EMBODIMENT

Figure 1:
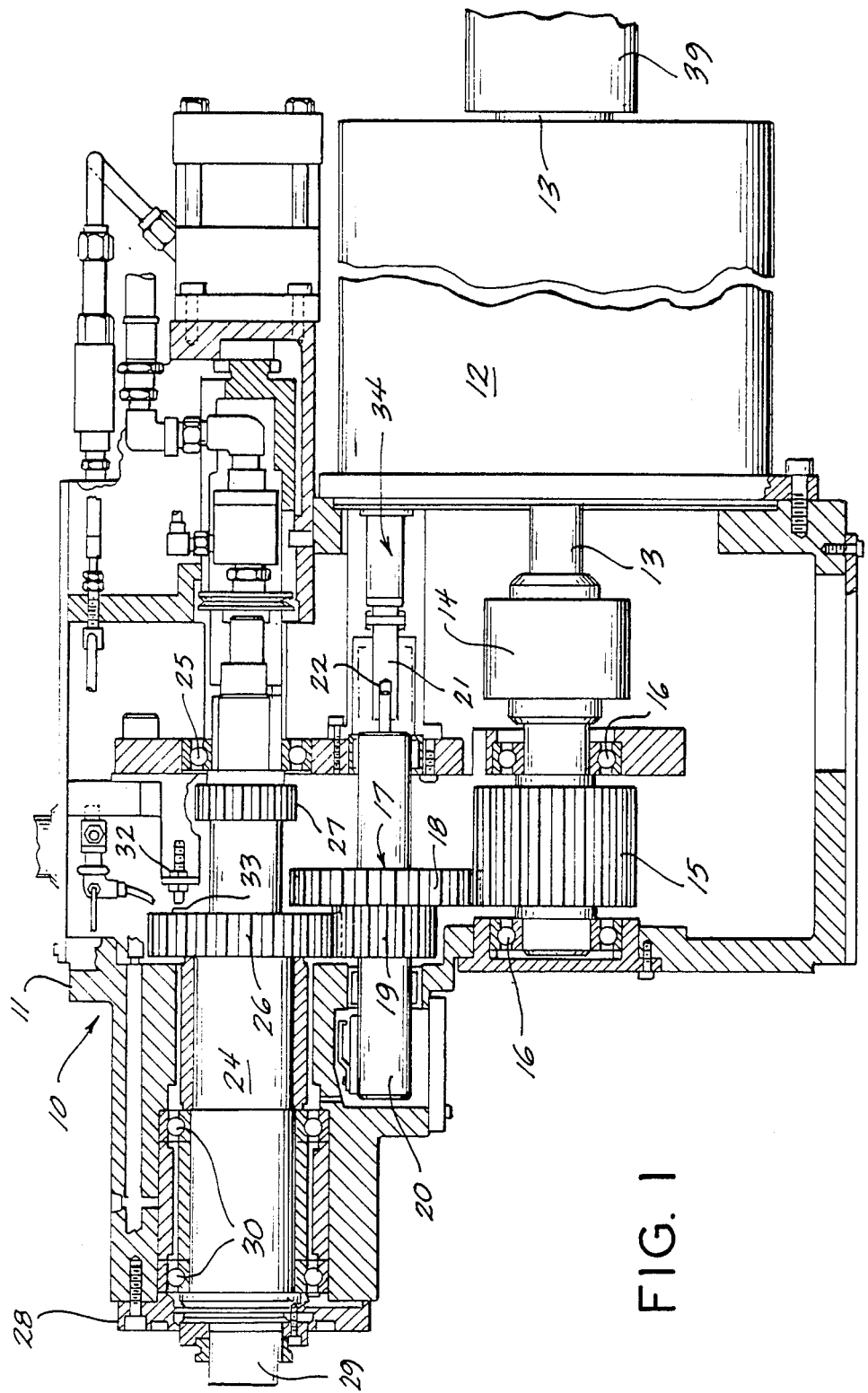
FIG. 1 is a view in longitudinal cross section of a spindle drive system incorporating the features of the present invention.

Referring to FIG. 1, the orientation apparatus generally identified by the reference numeral 10, which best carries out the features of this invention is shown and includes a spindle head 11 that is slidably mounted on a machine tool (not shown) for reciprocal movement thereon along a path normal to the path of travel of a machine tool table (not shown). A motor 12, typically a 15–25 HP (11.8–18.6 Kw) servo-controlled A.C. motor is fastened to the spindle head 11 by a set of screws such as indicated so that the shaft 13 of the motor 12 extends into the spindle head 11 through an appropriate passage to the right end thereof. The shaft 13 is connected by a coupling 14 to a drive pinion 15 which is rotatably journaled in the spindle head 11 coaxial with the motor shaft 13 by bearings 16 for rotation in unison with the motor shaft 13.

A cluster gear generally identified by the reference numeral 17 is comprised of a high speed gear 18 and a low speed gear 19 which are fixed on a shifter shaft 20 which is rotatably supported and movable axially along an axis parallel to the axis of shaft 13. Shaft 20 is reciprocated along its axis by an actuator in the form of a hydraulic piston and cylinder mechanism 34. The piston and cylinder mechanism 34 includes a piston rod 21 that is connected to the shifter shaft 20, by a coupling 22. In this connection, reference is made to the actuator 32 in the previously referred to U.S. Pat. No. 4,449,866 for purpose of illustrating a typical hydraulic piston and cylinder mechanism for shifting a cluster gear.

A hollow bore spindle 24 is journaled in the spindle head 11 by bearings 25 and 30 for rotation about an axis parallel to the axes of rotation of both drive pinion 15 and cluster gear shifter shaft 20. Spindle 24 has two gears 26 and 27 keyed to it which are each dimensioned to meshingly engage the cluster gears 19 and 18, respectively. Low speed gear 19 will engage the gear 26 when the cluster gear 17 is at its forwardmost position as indicated in FIG. 1 to establish its low range of operation. When in its rearward position, high speed gear 18 will mesh with the gear 27 to effect a high speed range for the rotation of spindle 24. The spindle 24 is rotatably supported at its forward end in the spindle head 11 by the bearing 30 that is secured in the spindle head 11 by a retainer 28.

A target projection 33 is mounted on the gear 26 for rotation therewith in an orbit as the gear 26 and therefore the spindle 24 rotate. Positioned in alignment with the target 33 is a proximity sensor 32 which is mounted in the spindle head 11 at a known location and positioned to be actuated by passage of the target 33 as the spindle 24 rotates.

Figure 2:
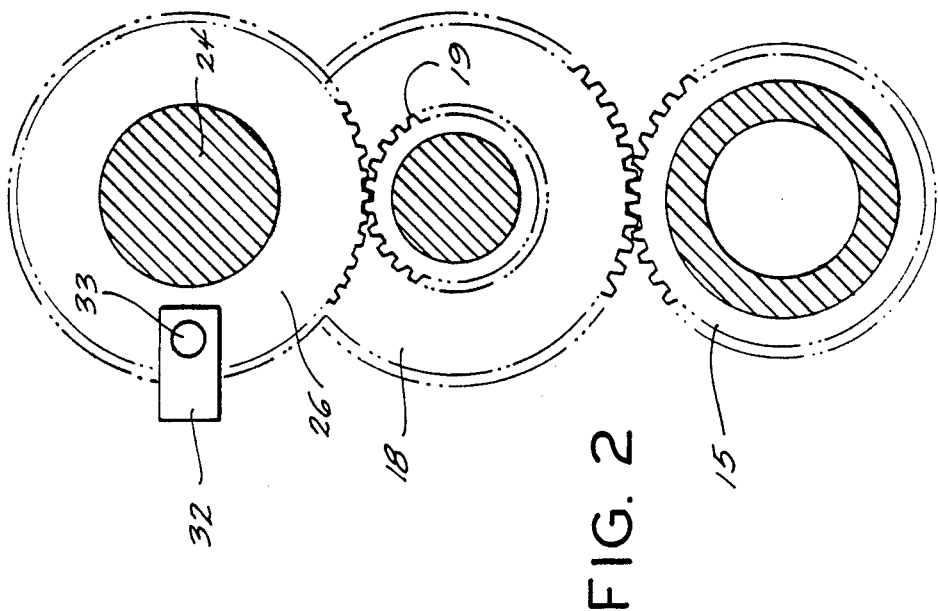
FIG. 2 is a detail view partially in vertical section and partially in elevation illustrating the gearing of the spindle drive system shown in FIG. 1 and depicting the proximity sensor in conjunction with a spindle gear.
Figure 5:
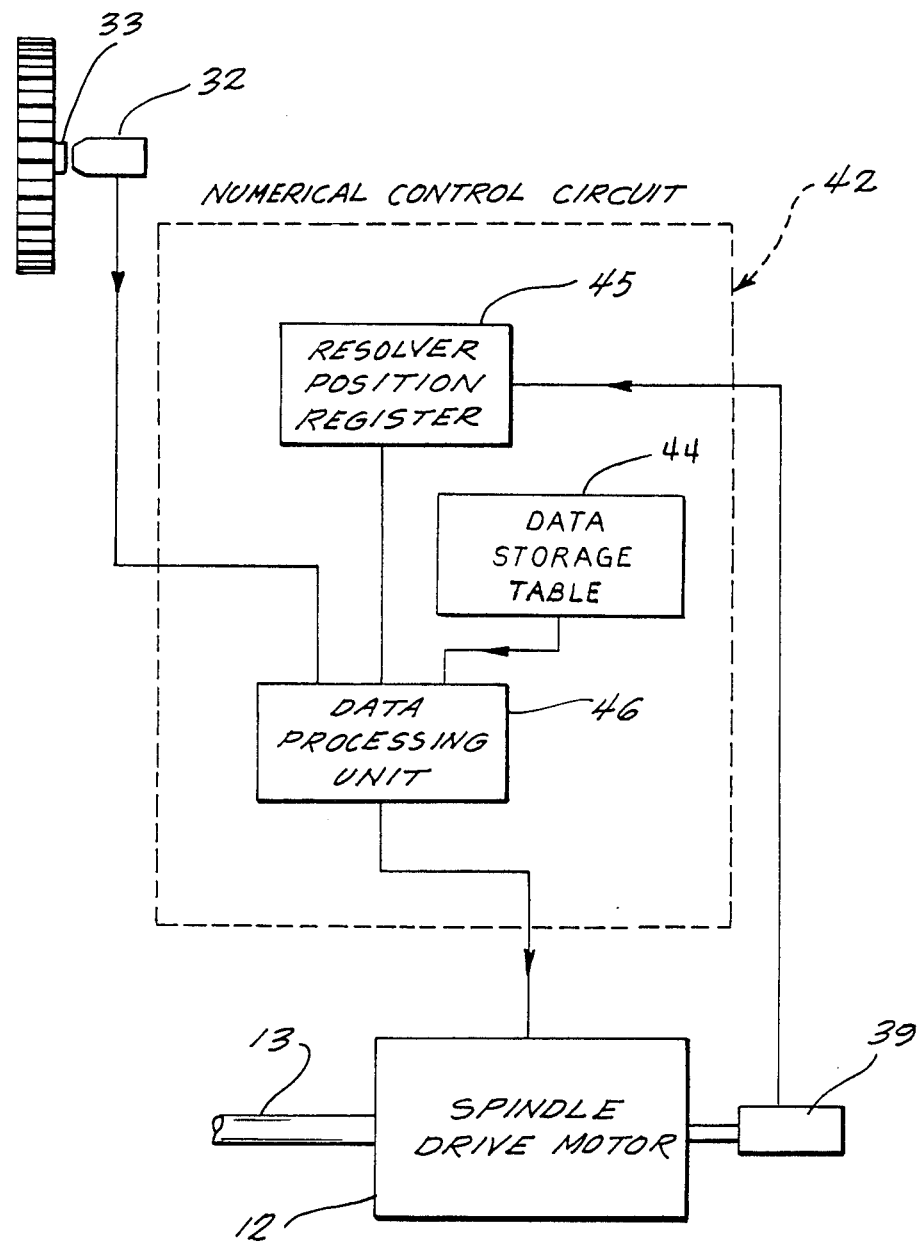
FIG. 5 is a diagrammatic view showing the interconnection of the resolver with the computerized numerical control circuit and the spindle motor drive.

The motor shaft 13 also extends rearwardly from the motor 12 for driving a transducer 39 which for the purpose of this description will be assumed to be a resolver although other types of transducers, such as an encoder could be employed. Referring specifically to FIG. 2 it will be seen that the drive pinion 15 is meshingly engaged with the high speed gear 18 and the low speed gear or auxiliary gear 19 is meshingly engaged with gear 26 on the spindle 24. This represents the low range position of the gears which is the position employed to terminate spindle rotation such that the spindle is in the keylock position, in preparation for a tool change operation.

When the spindle is in the keylock position, a keyway (not shown) formed in the spindle is aligned with a tool holder key so that the key is inserted into the keyway as the toolholder is inserted into the spindle 24. Positive drive between the spindle and a cutter engaged by the toolholder is thus achieved.

Figure 3:
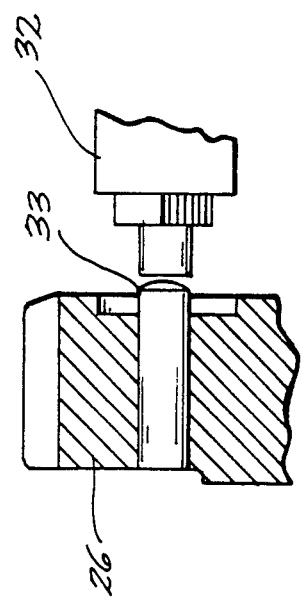
FIG. 3 is an enlarged fragmentary view of the sensor co-operating with the target on the spindle gear shown in FIG. 2.
Figure 4:
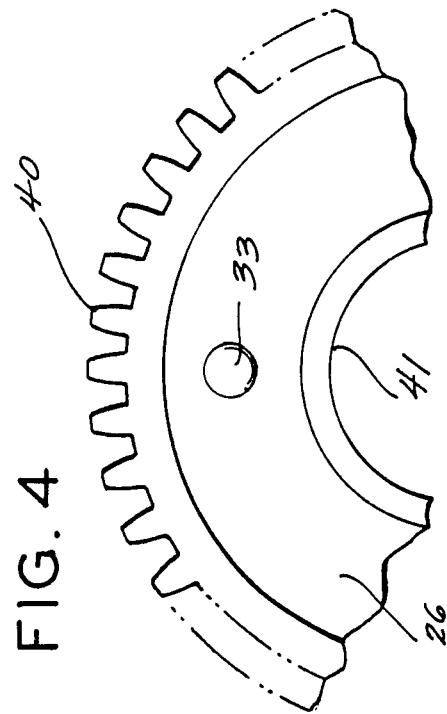
FIG. 4 is an enlarged fragmentary view showing the target mounted on the spindle gear for actuating the sensor to register each revolution of the spindle in the numerical control circuit.

The spindle keyway may be positioned on the spindle at some arbitrary angle, such as 90° with respect to the position of the target 33, depending on the characteristics of the machine. FIG. 3 represents a more detailed view of the target 33 carried by the gear 26 which rotates with the spindle 24 so that the target 33 revolves in an orbit in unison with the spindle 24. The proximity sensor 32 generates a pulse each time the target 33 passes it, so that a pulse is produced for each revolution of the spindle. In FIG. 4, a preferred location of the target 33 is indicated with respect to the gear 26 which is between the teeth 40 and the shaft receiving portion 41.

Operation

A better understanding of the advantages of the invention and the unique method of its operation will be had from the following description of its operation. In the present embodiment, the drive apparatus performs work in the high range, and is usefully brought into the low range in order to stop the spindle 24 for a tool change operation. When the apparatus is in low range, the gear 26 is meshed with the gear 19 of the cluster gear 17, as stated above. Thus, the spindle 24 is interconnected to the resolver 39 on the motor drive shaft 13 through a gear train wherein, for purposes of illustration, the following gears are provided with the following numbers of teeth: gear 26 has 48 teeth; gear 19 has 24; gear 18 has 48; and drive pinion 15 has 40. This results in a gear ratio of 2.4 to 1 between the spindle 24 and the motor shaft 13 when the gear 19 is in mesh with the gear 26 to establish the low range of operation. It will be appreciated that when the cluster gear 17 is shifted from high range position to low range position, the gear 18 is shifted out of engagement with the gear 27. The angular position of the spindle 24 with respect to the shaft 13 is thus allowed to change arbitrarily, whereby spindle position becomes unknown, even after the gear 19 has come into engagement with gear 26 to establish low range operation and re-establish synchronous operation between the spindle 24 and shaft 13. To have the spindle properly oriented when its rotation is discontinued, and thus achieve the desired keylock position for cooperation with a cutter being oprably engaged in the spindle by an automatic tool change mechanism, the angular position of the spindle 24 must be determined.

To this end, the proximity sensor 32 will output a pulse each time the target 33 passes it as the gear 26 rotates with the spindle 24. Such pulse is transmitted to a data processing unit 46 which is part of the numerical control circuit 42. The resolver 39 actually produces an analog signal in the form of a sine wave and generates one complete sine wave for each revolution of shaft 13. This analog signal is transmitted to a resolver position register device 45 of the numerical control circuit 42 which processes the information to divide it into parts of a circle. Thus, the numerical control circuit 42 may divide a complete sine wave into increments of five seconds of a revolution so that it would divide each complete revolution into 4320 divisions. A count is registered in device 45 to represent the rotation of the motor shaft 13 through a single division, whereby 4320 counts are registered for one complete shaft revolution. Hereinafter, the total number of counts produced by the resolver during a complete shaft revolution wil be designated as "m".

If the spindle 24 is rotating synchronously with resolver 39 in the low range, and the resolver generates a "zero" count when a sensor pulse occurs, then the number of counts contained in register device 45 at the succeeding consecutive pulses produced by the proximity sensor 32 will be as follows: 0 at the start; 2.4 m at completion of the first spindle revolution; (in view of the aforstated 2.4 to 1 gear ratio); 2×2.4 m or 4.8 m at completion of the second spindle revolution; 3×2.4 m or 7.2 m at completion of the third spindle revolution; 4×2.4 m or 9.6 m at completion of the fourth revolution; and 5×2.4 or 12.0 m at completion of the fifth revolution. If the integral revolutions are deleted from the results of the multiplications, one develops the following sequence of register count values: 0; 0.4 m; 0.8 m; 0.2 m; 0.6; 0 m. Deletion can be accomplished, for example, by clearing register 45 each time the number of counts stored therein reaches m. Thus, the only possible register count values which can coincide with the occurence of pulses are those of the above sequence.

However, assume that during a gear shift, the gear 26 and spindle 24 are displaced angularly with respect to shaft 13 by one gear tooth, before the cluster gear is re-engaged to bring the spindle and shaft back into synchronous rotation. Since the gear 26 has 48 teeth, the amount of angular displacement, expressed in registered counts is 1/48×2.4 m=0.5 m. Accordingly, the value 0.05 must be added to each of the five discrete values in the above sequence, so that the possible register count values which can coincide with pulses become 0.5 m; 0.45 m; 0.85 m; 0.25 m; 0.65 m. When the gear 26 is angularly displaced with respect to the shaft 13 and the resolver 19 by two teeth, the value 0.10 m must be added to each of the five discrete original values to produce possible count values 0.10 m; 0.50 m; 0.90 m; 0.30 m; and 0.70 m. In like manner when the gear 26 is displaced by three teeth the value 0.15 must be added, to produce the count values 0.015 m; 0.55 m; 0.95 m; 0.35 m; and 0.75 m.

When the gear 26 is angularly displaced by four gear teeth with respect to the shaft and resolver 39, the value 0.20 m must be added to each of the original five register count values. This results in the register count values at which pulses can possibly occur becoming 0.20 m; 0.60 m; 1.0 or 0 m; 0.40 m; and 0.80 m. It will be noted that these five values are identical to those calculated initially when the spindle 24 and the gear 26 were in the same angular relationship with the resolver 39 which existed prior to gear shift.

It has thus been found that if the gear 26 and spindle 24 are angularly displaced from the shaft 13 and the resolver 39 by more than three teeth during the period of gear disengagement, the only sequences of possible register count values which can occur after re-engagement of the gears is one of those stated above. For example, if the gear 26 and spindle 24 are displaced by five gear teeth, the calculated possible values will conform to those calculated when the gear 26 and spindle 24 are displaced by one tooth. Thus, after the gears connecting the spindle 24 and the resolver 39 have been engaged, disengaged and then re-engaged, such as occurs in shifting from high-range operation to low-range operation, the only possible count values which can be contained in register 45 when a pulse is generated by sensor 32, according to the above calculations, are the following values: 0; 0.05 m; 0.10 m; 0.15 m; 0.2 m; 0.25 m; 0.30 m; 0.35 m; 0.4 m; 0.45 m; 0.50 m; 0.55 m; 0.6 m;

0.65 m; 0.70 m; 0.75 m; 0.8 m; 0.85 m; 0.90 m; and 0.95 m.

To determine the angular position of spindle 24 after a shifting operation has been completed, so that the spindle 24 and shaft 13 are rotating synchronously, but in unknown relationship, each of the above values is stored in the numerical control circuit 42, such as in the data storage table 44. Upon generation of a pulse by sensor 32, the data processing unit 46 observes the count value contained in the register 45. Assuming for the moment that the sensor 32, register 45 and related components are all perfect devices, the observed count will be a particular one of the above calculated values stored in table 44. The particular count value thus indicates the orientation of the shaft 13 with respect to the spindle head 11 when the pulse is produced. At such time, the spindle 24 is in a known angular position with respect to the spindle head 11, as determined by the respective locations of sensor 32 on spindle head 11 and of target 33 on gear 26. Since the angular positions of spindle 24 and shaft 13 with respect to the spindle head 11 are both known at the same point in time with respect to the fixed spindle head 11, and since they are now in synchronous relationship, the data processing unit 46 can readily determine the relative orientation between the shaft and the spindle. The data processing unit 46 may then operate motor 12 to terminate rotation of spindle 24 such that spindle 24 is oriented in its keylock position.

It will be appreciated that proximity sensor 32 and respective components of numerical circuit 42 are in fact real-world or practical devices and not ideal or perfect. Thus, the proximity sensor 32 does not always trigger at the exact same location with respect to the target 33 with each spindle revolution. Also, register 45 may not operate to update successive counts quickly enough to be truly representative of the position of shaft 13 when a pulse is generated. However, it has been found that devices available for use in the above embodiment are sufficiently accurate to insure that any error in the count value in register 45 when a pulse occurs will always be much less than 0.05 m. Thus, the count value which is measured or observed each time a pulse is produced will always be much closer to a particular one of the above possible count values stored in table 44 than it will be to any other possible count value. Thus, data processing unit 46 is operated to select such closest possible count value as the true value to be used in determining the angular displacement of spindle 24 with respect to shaft 13 and resolver 39. For example, if the reading of the register received when a pulse occurs is 0.11 m, the data processing unit 46 selects 0.10 m from the table 44 as the count value to use in determining spindle orientation.

It is to be noted that data processing unit 46 can operate to determine spindle orientation after a single pulse, after a number of successive pulses, or may calculate spindle orientation after each of a number of successive pulses and compare the results of respective calculations.

It should be understood that the aforegoing method of ascertaining the actual angular position of the spindle 24 with respect to a motor drive shaft 13 is not restricted to a specific shifting gear train ratio as previously set forth. The aforegoing method is operable with any gear train which would be utilized for driving a machine tool spindle, or other rotary member, wherein the gear ratio would first be established, and then used to determine the discrete possible register count values coinciding with sensor pulses. It will thus be seen that through the present invention there is now provided a unique apparatus as well as a method for determining angular position of a machine tool spindle after the spindle and a resolver have been de-synchronized during the shifting of gears in the gear train. Through the use of a computer, data generated through a gear position sensor and resolver can be efficiently employed in order to precisely position the spindle for a tool change operation. Further, the method and apparatus of this invention utilizes readily available components so that costly adaption of existing equipment is avoided.

Although the illustrative embodiment of the invention has been described in considerable detail for the purpose of fully disclosing a practical operative structure incorporating the invention, it is to be understood that the particular apparatus shown and described is intended to be illustrative only and that the various novel features of the invention may be incorporated in other structural form without departing from the spirit and scope of the invention as defined in the sub-joined claims. For example, register 45 could comprise either a physical device, or general circuitry of a computer programmed to perform the functions of a register device. Also, the disclosed system could be readily configured to determine spindle position while operating in the high range rather than in the low range.

The principles of this invention having now been fully explained in connection with the foregoing, I hereby claim as my invention:

1. In a machine tool, apparatus for selectively driving a rotatable first member mounted in a frame comprising a rotatable second member; means for controllably driving said second member; means for generating a first signal indicating the angular position of said second member relative to said frame as said second member rotates; means for locking said first member in one of a plurality of discrete angular orientations with respect to said second member and then rotating said first member in synchronism with said second member; and means for sensing the angular orientation of said first member with respect to said second member when said first and second members are synchronously rotating, wherein said sensing means comprisies:

means for generating a second signal to provide notice that said first member is in a specified angular position relative to said frame;

means for storing a plurality of values of said first signal, each of said stored values comprising an expected value of said first signal when said first member is corresponding one of said plurality of discrete angular orientations with respect to said second member and in said specified angular position relative to said frame; and means for comparing the actual value of said first signal when said second signal occurs with said stored values and selecting the discrete angular orientation corresponding to the stored value which is closest to said actual value as being the actual orientation of said first member with respect to said second member.

2. The apparatus of claim 1 wherein:
said means for generating said second signal comprises means for generating a pulse when said first member is in said specified angular position relative to said frame.

3. The apparatus of claim 2 wherein said pulse generating means comprises:
   a target mounted to rotate in an orbit with the rotation of said first member; and
   a proximity switch supported along the path of travel of said target so that said proximity switch is activated by the passage of said target to indicate the time at which said first member is in said specified angular position with respect to said frame.

4. The apparatus of claim 1 wherin:
   said means for driving said second member comprises a motor and a numerical control operating said motor;
   said second member comprises a drive shaft of said motor; and
   said means for generating said first signal comprises a resolver mounted to said shaft to provide an output representing the angular position of said shaft relative to said frame and a register updated by said resolver output to provide a count representing said shaft angular position.

5. The apparatus of claim 4 wherein:
   said first member comprises a spindle disposed to receive a tool from an automatic tool changing mechanism when said spindle is in a critical angular position with respect to said frame;
   said locking means comprises a gear train of specified gear ratio; and
   said numerical control includes a processor responsive to said actual orientation of said first member with respect to said second member to operate said motor to rotate said spindle to said critical angular position.

6. A method of determining angular orientation of a first member with respect to a second member, both members being mounted for rotation relative to a frame and the second member selectively driving the first member through a gear train, the method comprising the steps of:
   generating a first signal to indicate that said first member is in a specified angular position relative to said frame;
   generating a second signal representing the angular position of said second member relative to said frame as said second member rotates;
   storing all values of said second signal which are possible when said first and second members are engaged through said gear train and said first member is in said specified angular position relative to said possible values, each of said stored values corresponding to one of a number of discrete possible orientations of said first member with respect to said second member when said first and second members are engaged through said gear train;
   comparing the actual value of said second signal when said first signal is generated with all of said stored values to determine the stored value which is closest to said actual value; and
   selecting the orientation of said first member with respect to said second member to which said closest stored value corresponds as being the actual orientation of said first member with respect to said second member.

7. A method of angularly orienting the spindle of a machine tool operated by a numerical control circuit into a pre-determined angular position wherein the spindle is rotated by a motor through a shiftable gear transmission, the method comprising the steps of;
   driving a transducer directly from the motor shaft;
   transmitting the output of said tranducer to said numerical control circuit;
   producing an electrical pulse when said spindle is in a known orientation relative to a fixed point;
   coupling the electrical pulse to said numerical control circuit;
   comparing the transducer output at the same time that a pulse is produced with a plurality of values stored in said numerical control circuit corresponding to possible orientation of said spindle with respect to said motor shaft to determine the actual orientation of said spindle with respect to said motor shaft; and
   controlling said motor in response to said actual orientation of said spindle with respect to said motor shaft to accurately stop said spindle in the pre-determined angular position.

* * * * *